United States Patent [19]

Theunissen et al.

[11] Patent Number: 5,393,507
[45] Date of Patent: Feb. 28, 1995

[54] SILICATE PRODUCTS

[75] Inventors: Joseph P. H. Theunissen, Eijsden; Theo Osinga, An Cadier En Keer, both of Netherlands

[73] Assignee: Unilever Patent Holdings B.V., Rotterdam, Netherlands

[21] Appl. No.: 25,733

[22] Filed: Mar. 3, 1993

Related U.S. Application Data

[63] Continuation of Ser. No. 775,931, Dec. 31, 1991, abandoned.

[30] Foreign Application Priority Data

Mar. 1, 1990 [GB] United Kingdom ................. 9004562

[51] Int. Cl.⁶ .............................................. C01B 33/32
[52] U.S. Cl. .................................... 223/332; 423/334; 264/118; 23/313 AS
[58] Field of Search ................. 423/332, 334; 264/118; 23/313 AS

[56] References Cited

U.S. PATENT DOCUMENTS

| | | | |
|---|---|---|---|
| 3,687,640 | 8/1972 | Sams et al. | 23/313 |
| 3,782,906 | 1/1974 | Pierce | 23/313 |
| 3,832,434 | 8/1974 | Flood et al. | 264/117 |
| 3,839,226 | 10/1974 | Yates | 502/407 |
| 3,868,227 | 2/1975 | Gericke et al. | 23/313 |
| 3,875,282 | 4/1975 | Steinreich | 264/140 |
| 3,918,921 | 11/1975 | Pierce | 23/313 |
| 3,931,036 | 1/1976 | Pierce | 264/118 |
| 3,932,140 | 1/1976 | Jayawant et al. | 501/84 |
| 3,933,670 | 1/1976 | Brill et al. | 252/99 |
| 4,126,423 | 11/1978 | Kongsgaarden | 23/293 |
| 4,235,856 | 11/1980 | Kostinko | 423/329 |
| 4,539,191 | 9/1985 | Kostinko | 423/332 |
| 4,613,578 | 9/1986 | Hertzenberg | 502/64 |
| 4,834,902 | 5/1989 | Pioch et al. | 252/135 |

FOREIGN PATENT DOCUMENTS 2227224 11/1974 France.

*Primary Examiner*—Anthony McFarlane
*Attorney, Agent, or Firm*—Cushman Darby & Cushman

[57] ABSTRACT

The characteristics of compacted sodium silicate, in particular the bulk density, are improved by heating the material at an elevated temperature in an agitated bed. Bulk density in the region of 1 kg/liter can be obtained.

6 Claims, No Drawings

SILICATE PRODUCTS

This is a continuation of application Ser. No. 07/775,931, filed on Dec. 31, 1991, now abandoned.

FIELD OF THE INVENTION

This invention relates to solid silicate products intended for use in particulate detergent compositions. These silicate products act as a source of alkalinity for the detergent powder when in use. Thus, in common with the other components of the detergent composition, the silicate product is required to have acceptable water solubility, be non-caking have the required bulk density and not provide fines by attrition when subjected to handling or while in the detergent powder.

BACKGROUND TO THE INVENTION

Detergent compositions intended for mechanical dishwashing will usually require a component capable of providing a considerable alkalinity in the wash liquor. Sodium silicates having a $SiO_2/Na_2O$ mole ratio from about 1.5:1, preferably from 1.8:1 to about 3.3:1, preferably to 2.2:1 are particularly suitable for this purpose and also they protect glassware from corrosion. There is a general movement towards providing detergent compositions with increased bulk densities i.e. above about 700 g/l, preferably above 850 g/l and more preferably up to 1 kg/l. Sodium silicates within the mole ratio 1.8 to 2.2:1 range will be referred to herein as sodium disilicates, although strictly this term is applicable only to those silicates having a mole ratio of about 2:1. Disilicates and other silicates can be formed into a product of the desired bulk density by compacting the appropriate feedstock, which may be spray-dried material, between rollers to provide a compacted sheet-like product which is subsequently broken up and sieved to provide the desired particle size range. Examples of procedures which provide these compacted materials will be found in U.S. Pat. No. 3,875,282 (Stauffer Chemical Co.) and U.S. Pat. No. 3,931,036 (Philadelphia Quartz Co.). Compacted silicates obtained from spray dried powders will usually have a water content of about 23%. Usually the maximum tolerable water contents for spray dried silicates with ratios between 1.5 and 3.3 is 14% to 30%. For disilicates the range is 14%, preferably from 19% to 23%.

The method of the invention is of value in preparing compacted silicate products with BDs above 850 g/l and, more preferably, above 900 g/l having suitable use properties. For compacted silicates already having a BD above 850 g/l the method provides a route to reducing attrition loss.

GENERAL DESCRIPTION OF THE INVENTION

The sodium disilicate or other silicate product obtained by compaction displays a bulk density below that required for the compositions of higher bulk density, say above 850 g/l and demonstrates a relatively high loss of material as fines by virtue of the attrition the product undergoes when handled and incorporated in the product. A particular source of attrition comes from the pneumatic handling devices commonly used in transporting the raw materials before preparing the detergent composition by mixing the desired ingredients. The particle size of the desired silicate granules will preferably be in the range 0.4 to about 0.75 mm, preferably to 1.0 mm but the process of the invention is applicable to materials having particle sizes in the range 0.3 to 2 mm.

The applicants have found that the bulk density of compacted sodium silicate can be increased by treating the compacted silicate with added moisture preferably at elevated temperatures, i.e. above 60° C., in an agitated bed. The device in which the silicate is treated may be, as examples, a rotating drum, cement mixer, Eirich-type open pan, or Lödige mixer. The agitated bed can be formed in free fall/tumbling mixer, fluidised bed or paddle mixer as examples. These provide a rapid renewal of exposed surfaces and application of shear to round off the particle edges while the compacted silicate is subjected to heat. In general the bed is required to be agitated at a considerable rate to ensure there is inter-particle contact while the particles are subjected to heat.

The treated product may be cooled in an air stream or other cooling gas.

The period of treatment will preferably be at least 5 minutes and is unlikely to be required to be more than 30 minutes to give the desired benefit.

The invention provides a method of treating compacted sodium silicate granules, having a molar ratio $SiO_2/Na_2O$ of from about 1.5:1, preferably from about 1.8:1, to about 3.3:1, preferably to about 2.2:1, and an average particle size in the range from about 0.3 mm to about 2.0 mm, wherein the granules are subjected to heat at elevated temperatures above 60° C. in an agitated bed. Appropriate vessels in which the agitated bed can be prepared are an open rotating dish or a cylindrical vessel rotatable about the cylindrical axis. The dish or vessel must be operated so that tumbling is provided within the bed. The heat applied to the agitated bed is usually applied by heating the vessel to an appropriate temperature usually up to 100° C., but hot air or radiant heat may be used for some applications. Although temperatures above about 90° C. may be possible with some combinations of materials and machines, the applicants found above 90° C. the product began to cake and stick to the walls of the mixer.

The process of the invention also improves the attrition properties of the product. The breakdown of the product reduces as the temperature is raised and becomes very low above about 75° C.

The applicants believe the benefits achieved by the process of this invention are provided by the following mechanism although they do not desire to be held to it. During the heat treatment the compacted silicate begins to melt in the water it contains so the particles shrink and the edges round off. Bridging may begin at the contact points between the primary particles which were compressed together. Fines adhere to the larger particles and disappear from the system. The shrinkage of the particles and edge rounding provides the increased bulk density, while reducing attrition and without losing solubility.

Classes of detergent formulations of higher bulk densities, i.e. above 850 g/l, are those formulations intended for use in mechanical dishwashers and in fabric washing. The bulk densities can be considerably above the level quoted but usually they will not exceed 1000 g/l. The preparation of detergent powders having relatively high bulk density is described in a number of patent specifications. Thus EPA 0367339 (Unilever) describes a two step procedure utilising in sequence a high speed mixer densifier and a moderate speed granulator densifier. The process described utilises a particular starting material. In EPA 0220024 (Procter & Gamble) a process is described utilising a spray dried detergent powder as feedstock which is subjected to compaction using a roll compacter. In general the detergent formulations to which the present invention is applicable will contain from about 0.1% to about 40% by weight of surfactant, from about 10% to about 70% by weight, preferably 25% to 50% by weight of detergency builder.

Additionally the detergent formulations may contain polymeric materials to stabilise ingredients or give beneficial results during the washing procedure, e.g. suspension of soil. Furthermore they can promote dispersion of components present in the wash liquor i.e. fluorescers, germicides and, in particular, silicate components. In addition to providing a degree of alkalinity in the wash liquor the silicate components also act to reduce corrosion in washing machines and protect glass against the effects of high alkalinity in dishwashing.

In general there is no restriction on the detergent active material or detergency builders which may be utilised in the present invention. Thus the detergent actives, also termed surfactants, may be selected from anionic, nonionic, ampholytic, zwitterionic materials or mixtures thereof. The anionic and nonionic surfactants can be utilised alone or as mixtures. Examples of suitable surfactants are water soluble alkaline metal salts of organic sulphates and sulphonates having C8 to C22 alkyl radicals. Alkyl sulphates may be obtained by sulphating higher, C8 to C18, alcohols obtained from natural sources e.g. tallow or coconut oil. Sodium and potassium alkyl (C9 to C20) benzene sulphonates, and specially sodium linear secondary alkyl (C10 to C15) benzene sulphonates, are preferred surfactants. Suitable nonionic surfactants include the reaction products of compounds having a hydrophobic group and a reactive hydrogen atom, e.g. aliphatic alcohols, acids, amides or alkyl phenols with alkylene oxides, especially ethylene oxide alone or with propylene oxide.

TEST METHODS

Bulk density: A cylinder (height/diameter ratio of approximately 2) is filled with powder to to a measured volume ca 1.liter and the sample weighed.

Ball mill friability (BMF): This measures the breakdown of granules under conditions representing high shear mixing.

The sample of granulate is sieved to remove oversize (>1200 μm) and undersize (<200 μm) and then split into two parts. One part is used to measure the size distribution by sieving. The other part is put in the ball mill.

The ball mill is a 10×10 cm cylinder, containing 50 porcelain balls of 1 cm diameter and operated at 90 rpm, while set at a declination of 16 degrees. After 5 minutes milling the sample is removed and sieved to determine the size distribution. Ball mill friability is expressed as the percentage increase in fines <200 μm.

Particle size: Measured using standard sieves (Retsch).

SPECIFIC DESCRIPTION OF THE INVENTION

Examples of the method of the invention will now be given to illustrate but not limit the method of treating compacted silicate.

Example

The apparatus used was a double walled cylinder with an inner diameter 19 cm, length 17 cm and volume 5 liters. The mixer, which was from Lödige of Germany, included four blades rotatable about the horizontal axis to scrape the total inner surface of the cylinder. The mixer was heated to a certain temperature using hot air circulating water and compacted sodium disilicate (1.5 kg), obtained from Crosfield Chemicals of Eijsden Netherlands added. The mixer was then rotated and heated to the desired temperature, in this example 85° C. with the time of treatment being varied for Example I, II and III. The compacted disilicate was heated to 85° C. in 10 minutes with the blades rotated at 150 revolutions per minute. After a measured residence time the product was transferred to a fluidised bed for cooling in air.

The feedstock and products were subjected to a number of tests and the results are shown in Table I.

TABLE I

| Material: | FEEDSTOCK | EX I | EX II | EX III |
|---|---|---|---|---|
| Temperature (°C.) | | 85 | 85 | 85 |
| Treatment time (mins) | | 10 | 15 | 25 |
| <200μ (%) | NM | 5.24 | 4.14 | 3.6 |
| 200–630μ (%) | NM | 79.06 | 80.94 | 80.6 |
| 630–1000μ (%) | NM | 15.40 | 14.92 | 15.3 |
| >1000μ (%) | NM | 0.0 | 0.0 | 0.5 |
| Av. particle size (μ) | 780 | 490 | 510 | 550 |
| Bulk density (g/l) | 810 | 860 | 960 | 1030 |
| BMF (%) | 4.9 | <1 | <0.5 | <0.2 |

NM = not measured

The increase in bulk density which is accompanied by a reduction on BMF can be easily seen.

We claim:

1. A method of treating compacted sodium silicate granules, having a mole ratio $SiO_2/Na_2O$ of from about 1.5 to about 3.3:1 and an average particle size in the range from about 0.3 mm to about 2.0 mm, wherein the granules are heated in the presence of water to a temperature above about 60° C. in an agitated bed whereby the bulk density of the granules is increased and substantially no agglomeration takes place and attrition properties are improved.

2. A method according to claim 1 wherein the mole ratio is from about 1.8 to about 2.2:1.

3. A method according to claim 1 wherein the agitated bed is formed in a rotating cylindrical vessel rotatable about the cylindrical axis or in a tilted rotating dish.

4. A method according to claim 1 wherein the compacted silicate is heated to a temperature above about 75° C.

5. A method according to claim 1 wherein the compacted silicate is heated to a temperature not above about 90° C.

6. A method according to claim 4 wherein the silicate is heated for 5 to 30 minutes at 75° C. to 90° C. in the presence of moisture.

* * * * *